United States Patent [19]

McNally et al.

[11] Patent Number: 4,701,839

[45] Date of Patent: Oct. 20, 1987

[54] SAMPLED DATA SERVO CONTROL SYSTEM WITH FIELD ORIENTATION

[75] Inventors: Paul F. McNally, Gibsonia; Spencer W. Allen, Murrysville; Matthew G. Cimbala, Pittsburgh, all of Pa.

[73] Assignee: International Cybernetic Corporation, Pittsburgh, Pa.

[21] Appl. No.: 670,437

[22] Filed: Nov. 9, 1984

[51] Int. Cl.$^4$ ............................................. G05B 11/18
[52] U.S. Cl. ..................................... 364/167; 364/177; 364/179; 364/183; 318/715; 318/721
[58] Field of Search ............... 364/167, 169, 170, 174, 364/176, 177, 178, 179, 183; 318/138, 254, 636, 721, 722, 723, 724, 714, 601, 715

[56] References Cited

U.S. PATENT DOCUMENTS

| | | | |
|---|---|---|---|
| 3,987,282 | 10/1976 | Lau et al. | 364/174 |
| 4,245,298 | 1/1981 | Slater | 364/174 |
| 4,246,528 | 1/1981 | Nakajima | 318/721 |
| 4,276,504 | 6/1981 | Nagase | 318/721 |
| 4,329,636 | 5/1982 | Uchida et al. | 318/721 |
| 4,330,752 | 5/1982 | Rauskolb | 364/174 |
| 4,386,408 | 5/1983 | Imazeki et al. | 364/174 |
| 4,398,241 | 8/1983 | Baker | 364/174 X |
| 4,486,698 | 12/1984 | Blümner | 318/721 |
| 4,527,109 | 7/1985 | Hosokawa | 318/723 |
| 4,553,078 | 11/1985 | Wise | 318/601 |
| 4,577,271 | 3/1986 | Jones et al. | 364/174 |
| 4,578,763 | 8/1986 | Jones et al. | 364/178 X |

Primary Examiner—Jerry Smith
Assistant Examiner—Allen MacDonald
Attorney, Agent, or Firm—Reed Smith Shaw & McClay

[57] ABSTRACT

The present invention provides a high response inexpensive microprocessor based digital control system. The digital control system uses only one detector that detects only one motion characteristic of the device controlled by the system. In the preferred embodiment, the digital control system controls the field orientation, the position and the velocity of a movable member of a brushless motor by creating commands that represent the desired position of the movable member 1024 times per second. The system also provides methods for improving the accuracy and precision of the system.

31 Claims, 16 Drawing Figures

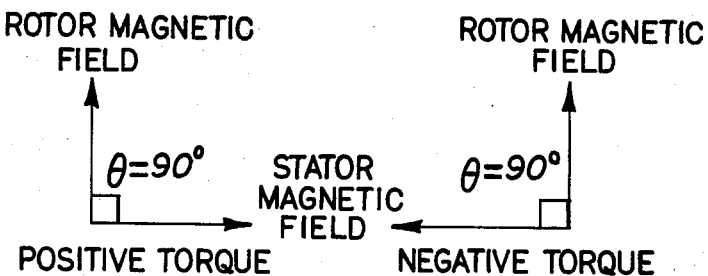
FIG. 4
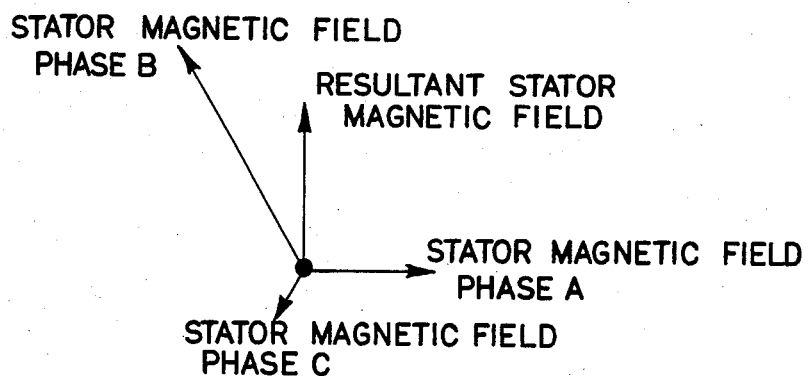
FIG. 5
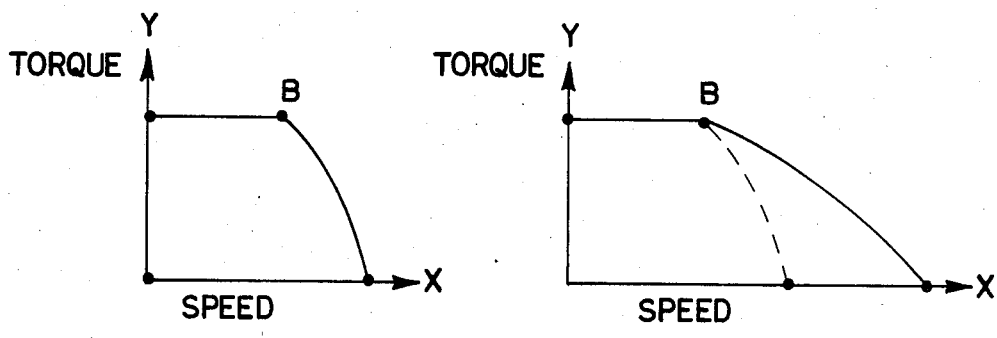
FIG. 6
FIG. 7

SAMPLED DATA SERVO CONTROL SYSTEM WITH FIELD ORIENTATION

BACKGROUND OF THE INVENTION

1. Field of the Invention

The present invention relates to motion control systems and, more particularly, to a servo control system operating in a sampled data mode. A servo control system is one which uses feedback to control the operation of the system. The control system usually controls the motion of a device such as a motor. It does this by monitoring a single motion characteristic of the device, usually the position, and uses this information to generate any other necessary motion characteristics. Once one knows the actual motion characteristics of the device, feedback techniques can be used to control the operation of the device to obtain any desired physically realizable performance.

Sampled data mode indicates how the single motion characteristic is monitored and how the control system operates. In a sampled data mode, characteristics are measured or monitored at discrete points in time over an interval rather than continuously over the entire interval.

Typically, this sampled data servo control system controls the operation of a motor with a rotatable shaft by applying a command signal to the motor to obtain the desired motion of the rotatable shaft. Shortly thereafter, the control system monitors the motion of the shaft to determine its position. The control system then uses this information to compare the actual motion with the desired motion. If there is any difference, an appropriate compensation is made in the command signal and then a new command signal is applied to the motor.

2. Description of the Prior Art

Designers of servo motion control systems have attempted to take advantage of advances in computer technology by designing servo control systems which respond more quickly to motion command signals or which more precisely control the movement of the device under control. For example, the working members of industrial robots must be capable of quick precise movement and, therefore, high response servo control systems are highly desirable to control these members.

A computer with a large memory capability and great computational power—referred to commonly as a main frame computer—or a large minicomputer is often used to implement a control system where great computational power is required. However, main frame computers and large minicomputers have not been used to implement high response industrial servo control systems because their expense is prohibitively great.

Microprocessors are much less expensive than main frame computers or large minicomputers. Therefore, servo control systems have been designed which are implemented by microprocessors. However, the use of microprocessors in servo control systems has created several other problems. In particular, the calculation speed of a microprocessor is not relatively high and, therefore, the response time of a control system using a microprocessor cannot be as high as is desirable. Further, a microprocessor performs calculations in integer fashion, which can cause errors when the results of the calculations are rounded. Therefore, the system may not control the motion of the controlled device with sufficient accuracy.

A typical prior art digital or analog brush-type DC servo control system is of the form depicted generally in FIG. 1. The control system in FIG. 1 receives motion commands and a set of signals representing the actual motion of the device under control and calculates any deviations in the motion of the device from the motion represented by the motion commands. Blocks A and B in FIG. 1 (also FIGS. 2, 3 and 10) can be implemented in either an analog or a digital manner and represent compensating gain lag-lead networks usually consisting of a combination of gain or time dependent following processes, which effect the manner in which the control system follows the motion commands. Depending on the control system, Blocks A and B can be implemented by hardware or software.

Many conventional brush-type DC servo systems use a microprocessor only to process motion commands. The servo loop is controlled by either conventional analog or high speed digital techniques. These systems do not fully use the capabilities of existing microprocessors. Accordingly, a digital servo control system has been designed which is implemented totally by microprocessors.

Typically, many prior art digital systems only perform the functions to the left of line C in FIG. 1 in a digital manner. The remainder of the system is implemented in analog form. The recent advancement of Direct Numerical Processing (DNP) enables the control system to perform everything to the left of line D in FIG. 1 with a microprocessor, leaving only the amplifier and the motion monitors to be implemented in analog form. As a practical matter, DNP control actually goes one step further and monitors only one of the actual device motions, usually the device position, and uses this motion signal to digitally create the other actual motion signals. A brush-type DC servo control system utilizing the recent advancement of DNP control is shown in FIG. 2 with everything to the left of line D being performed with a microprocessor.

The benefits and advantages of DNP control are explained in the related co-pending U.S. patent application Ser. No. 523,061 filed Aug. 15, 1983 entitled "SAMPLED DATA SERVO CONTROL SYSTEM WITH DEADBAND COMPENSATION". Until now DNP control could only be utilized to control brush-type DC motors. The present invention consists of the improvement which enables DNP control to be utilized with brushless synchronous and non-synchronous motors. Accordingly, the entire invention described and claimed in the co-pending application mentioned above (Ser. No. 523,061) is incorporated herein by reference and made a part of this application.

A typical prior art brushless servo control system is shown in FIG. 3. This system differs from the brush-type system shown in FIG. 1 by the necessary addition of a separate control loop for controlling the field orientation and thus the torque of a brushless motor.

In a brush-type DC motor, the application of DC current to the stator windings produces the necessary torque in the motor. In a brushless motor, however, the torque produced in the motor is not only a function of the current applied to the stator windings, but is also a function of the motor state (i.e., the position of the rotor with respect to the stator windings). Proper control of a brushless motor requires not only monitoring and controlling the current applied to the stator windings, but also monitoring and controlling the motor state.

The torque produced in a brushless motor is equal to the vector cross product of the stator magnetic flux vector ("stator magnetic field") and the rotor magnetic flux vector ("rotor magnetic field"). The maximum torque is produced when the rotor magnetic field is 90° out of phase with the stator magnetic field as shown in FIG. 4. When the stator magnetic field leads the rotor magnetic field, a positive torque is produced and when the stator magnetic field lags behind the rotor magnetic field, a negative torque is produced.

The rotor magnetic field is stationary with respect to the rotor but it is not stationary with respect to the stator. Thus, to produce a continuous positive torque, the stator magnetic field must rotate in order to be kept a predetermined angular distance ahead of the rotating rotor magnetic field. To rotate the stator magnetic field in the desired manner, the current in the stator windings is varied in exactly the right manner through the use of the added feedback loop.

In a three-phase brushless AC motor, individual stator winding magnetic fields are produced by currents in the three stator windings (Phase A, B and C) which are 120° apart. The resultant stator magnetic field is the vector sum of the individual stator winding magnetic fields as shown in FIG. 5. The servo control system applies these three stator currents such that the resultant stator magnetic field leads or lags the rotor magnetic field by the proper amount to produce the desired torque in the motor.

Typical prior art implementations of a brushless servo controller use a separate transducer to measure the position of the device. If the device is a motor, usually the position of the rotor shaft is measured. Once the position of the rotor shaft is known and thus the rotor magnetic field, the stator magnetic field is placed either leading or lagging it, depending on the sign of the torque command.

From an economic point of view, it is well-known that brushless AC devices and motors are substantially lower in cost than their equivalent brush-type DC counterparts. When a microprocessor based digital control system is used to control an AC brushless motor, additional problems are created. Not only does one have the problems inherent in a micoprocessor controlled system but one has the additional feedback loop with which to contend. The micropocessor must also be able to monitor and control the stator currents to produce the desired torque and response in the motor.

Similarly, there is the problem of the initial alignment of the rotor field and the field of the rotor position transducer. The position of the rotor field must be known to determine the location of the desired stator field so that the appropriate stator winding currents can be applied.

In a permanent magnet brushless motor, the rotor field is fixed with respect to the rotor position transducer. Therefore, knowing the position of the rotor implies knowing the position of the rotor field as long as the relationship between the rotor field and the rotor position transducer is known. A common method of handling this situation is to always align the rotor measuring device (i.e., the rotor position transducer) with the rotor field and therefore most brushless controllers assume that all motors are set up in this manner.

A problem can arise if a motor must be replaced with one which is not aligned with the rotor measuring device or if the motor cannot be set up as desired due to some other constraint. In these instances a typical brushless controller could not be used.

Another problem in brushless motor controllers involves the technique of dynamic phase advance. In a typical brushless motor, the torque vs. speed characteristic is similar to that shown in FIG. 6. A control system must first overcome the motor's back voltage before it can produce torque to accelerate the motor to a higher speed. The amount of system voltage available above the back voltage of the motor indicates the torque available to accelerate the motor. However, the motor's back voltage increases with motor speed until at point B, the system voltage is equal to the back voltage produced by the motor. When this point is reached, the motor will not go any faster without a reduction in torque.

There exists a technique called phase advance for achieving a higher speed than the speed at point B. The price for increased speed is lower than maximum torque as indicated in FIG. 7. This technique is a powerful and useful one because often at higher speeds, a lower torque is acceptable.

The phase advance technique involves reducing the back voltage of the motor to give the system voltage some margin to produce the additional torque necessary to accelerate the motor. This is achieved by weakening the rotor magnetic field.

The back voltage of the motor is related to the rotor field strength and the currents in the stator windings. By reducing the magnitude of the rotor field, the back voltage of the motor can be reduced. However, reducing the rotor field strength also reduces the motor torque. Assuming that after weakening the rotor field, there exists enough torque to accelerate the motor, the technique of rotor field weakening is viable.

The technique for implementing rotor field weakening involves changing the optimal 90° phase angle in FIG. 4. As shown in FIG. 8, if the phase angle is increased to something greater than 90°, there will be a component of the stator field vector along the y-axis which will subtract from the rotor field vector. The resultant weakened rotor field vector is depicted as R' and will produce less back voltage for a given system voltage enabling the motor to be accelerated to a higher speed. This technique of phase advancing can allow motor speeds in excess of twice that attainable without it and can even have the effect of compensating for system time lags and amplifier time lags.

In a typical brushless motor, the phase advance technique is usually a fixed function implemented by hardware. However, optimal phase advance varies depending on the brushless motor used, the loading conditions and the system voltage. Fixing the phase advance in hardware has many limitations, one of which is being unable to respond to the variations mentioned above.

Finally, a sampling problem exists with many brushless motor control system which are digital in nature. These systems rely on sampling to measure the rotor position and adjust the stator currents to produce the desired stator magnetic field. At high rotor velocities, the sampling of the rotor position may not occur often enough to yield the proper stator current. This places an upper limit on how fast the motor can go and still be controlled since at some speed the sampling technique is too slow for proper control and operation. Even at speeds below this limit, sampling can introduce other errors into the system. For instance, the stator field is fixed at each sampling cycle in the proper orientation to the rotor field for the desired torque. The rotor field, however, will move over the sampling cycle while the stator field remains constant. This effectively changes the proper torque angle.

Accordingly, there exists a need for a high response, inexpensive, accurate and precise microprocessor-implemented servo control system, capable of controlling a synchronous or a nonsynchronous brushless motor.

SUMMARY OF THE INVENTION

The present invention provides a sampled data system for controlling the motion of a device. The system is capable of controlling a brushless synchronous or nonsynchronous motor. It is typically used for controlling a brushless AC motor. The system comprises a source of motion command signals and a command processor which processes a command representative of the desired motion of the device by generating at least one series of electrical subcommand signals. Each subcommand signal represents a segment of the desired motion over a time interval. Also included is a motion detector for detecting a single motion characteristic of the actual motion of the device. The system includes a subcommand comparator for comparing the subcommand signals to at least one signal representative of the actual motion of the device and generating at least one error signal representative of the variation of the characteristic of the actual motion of the device from the corresponding characteristic of the motion represented by the subcommand signal. Additionally, the subcommand comparator can generate all the actual motion signals from the signal representative of the actual motion of the device. A modifier is provided for modifying the error signals so that the system exhibits a set of desired performance characteristics. A field orientation control for controlling the field orientation of the device is included as well as a converter for converting at least one phase control signal from the field orientation control to a signal which is applied to the device causing the device to exhibit the desired motion.

For a detailed description of similar elements, see co-pending U.S. patent application Ser. No. 523,061 filed Aug. 15, 1983 entitled "SAMPLED DATA SERVO CONTROL SYSTEM WITH DEADBAND COMPENSATION". The description and interaction of the elements described in the above-mentioned application are incorporated herein by reference as if fully set forth.

The invention comprises in combination with the foregoing the improvement obtained by the addition of field orientation control. Field orientation control enables a control system to control a device such as a brushless motor. For example, without field orientation control, the control system could only control brush-type motors and not brushless motors. The implementation of a brushless servo control system is shown in FIGS. 9 or FIG. 10 where all of the functions to the left of line E are handled by software instead of hardware. The software is programmed to control the stator field orientation to achieve the desired torque in the brushless motor.

Besides the straight forward control of a brushless motor, the control system with field orientation can also implement several other improvements. The digital control system described by the present invention does not require that the rotor measuring device actually be electrically aligned with the rotor field as long as the relationship between the rotor field and the rotor measuring device is known. The present invention is capable of determining the relationship between the rotor field and the rotor measuring device and compensating for any electrical offset. This capability is known as auto aligning and phasing. As part of the auto aligning and phasing, the control system can compensate for any phase-reversal caused by the way the rotor measuring device is electrically connected to the system.

The control system described by this invention can implement an improved form of dynamic phase advance implemented by software which can allow motor speeds in excess of twice that attainable without it, thus making the motor more versatile.

Finally the control system in the present invention can compensate for inherent time lags such as the sampling problem by adding a phase adjustment which is dependent upon speed and thereby improve the response of the entire system.

BRIEF DESCRIPTION OF THE DRAWINGS

For a better understanding of the invention, reference may be had to the accompanying drawings, in which;

FIG. 4 shows the magnetic field orientations for producing maximum positive and negative torque in a brushless motor.

FIG. 5 shows the magnetic field orientation for a three-phase stator.

FIG. 6 shows a typical torque vs. speed curve for a brushless motor.

FIG. 7 shows a typical torque vs. speed curve for a brushless motor using the dynamic phase advance technique.

DETAILED DESCRIPTION OF THE PREFERRED EMBODIMENTS

Figure 1:
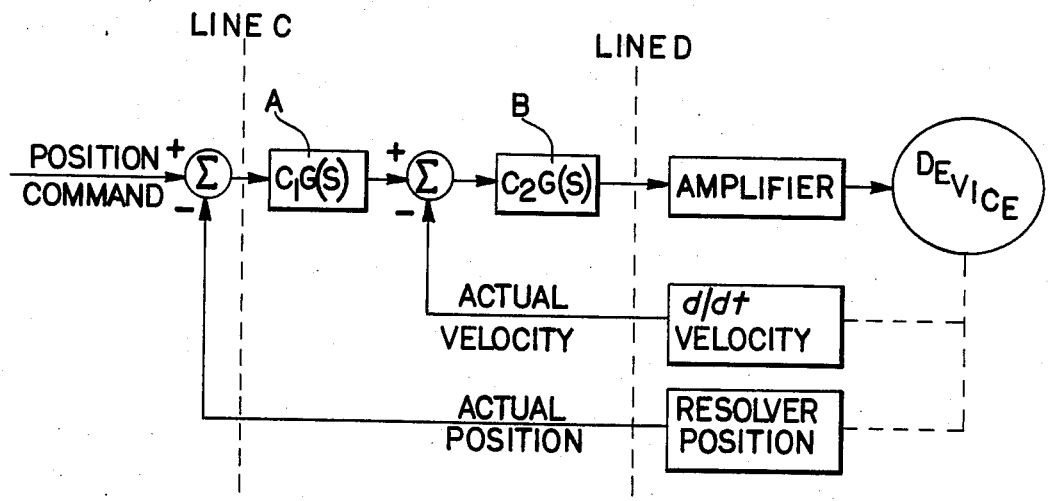
FIG. 1 shows a typical prior art digital or analog brush-type DC servo control system.
Figure 2:
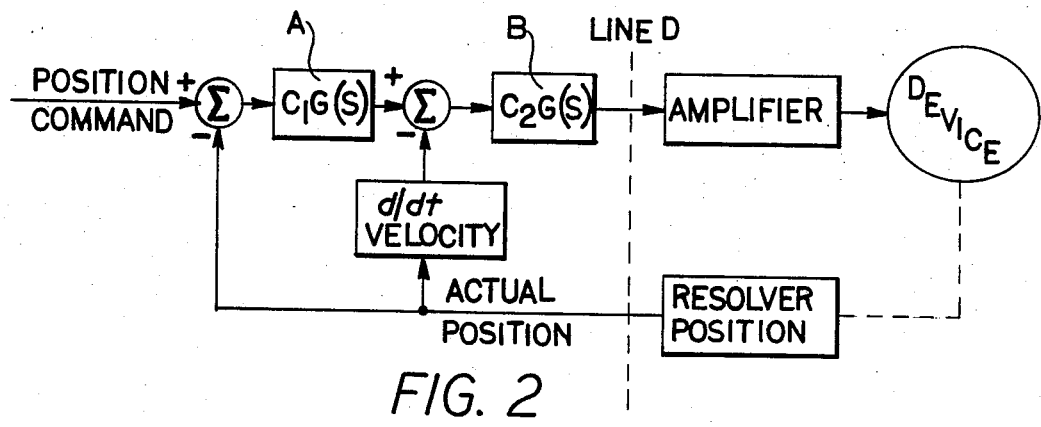
FIG. 2 shows a brush-type DC servo control system using the recent advancement of Direct Numerical Processing (DNP).
Figure 3:
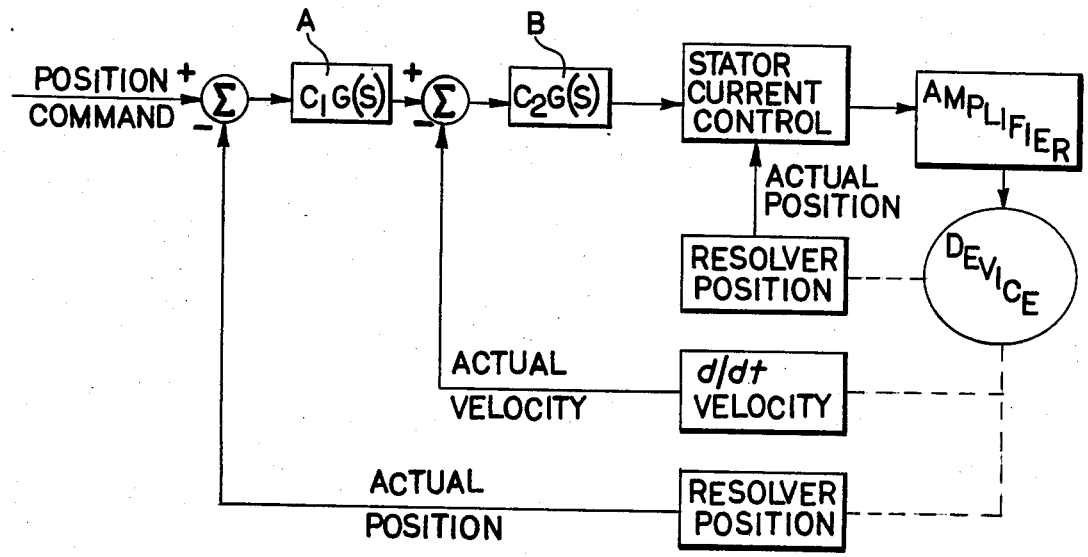
FIG. 3 shows a typical prior art digital or analog brushless servo control system.
Figure 8:
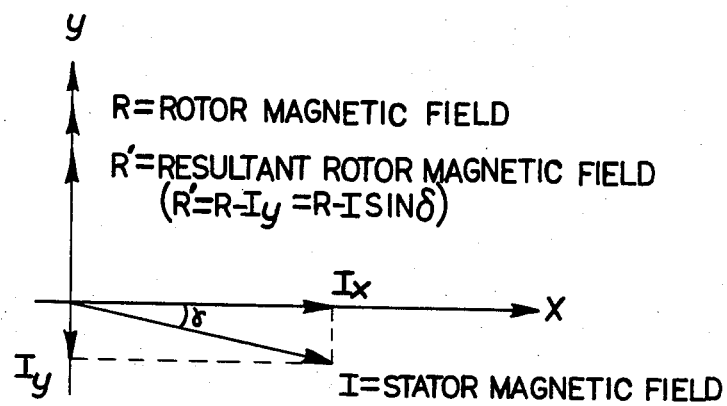
FIG. 8 shows the weakening of the rotor field obtained by the dynamic phase advance technique.
Figure 9:
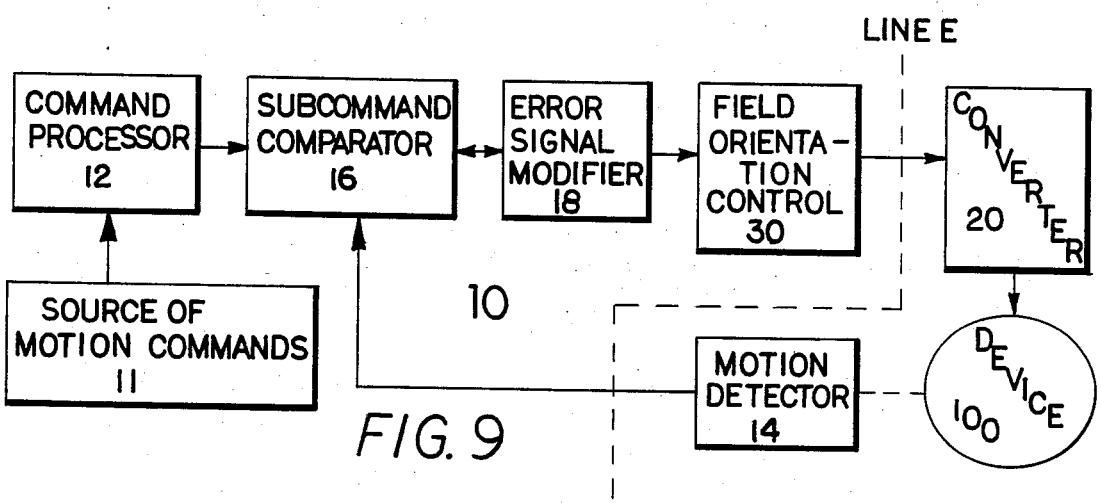
FIG. 9 shows the brushless servo control system described by this invention.

With reference to FIG. 9, the present invention comprises a servo control system 10 having most of the elements described and claimed in the related co-pending U.S. patent application Ser. No. 523,061 filed Aug. 15, 1983 entitled "SAMPLED DATA SERVO CONTROL SYSTEM WITH DEADBAND COMPENSATION." These elements, such as the command processor 12, the subcommand comparator 16, the error signal modifier 18, the motion detector 14 and the convertor 20 are also utilized in the present invention and their description and implementation as contained in the above-mentioned co-pending application (Ser. No. 523,061) are fully incorporated and included herein by reference as if set forth.

Typically control system 10 is implemented by a microprocessor which receives and analyzes motion information and generates motion commands with a desired constant frequency, generally defined as cycles per second. Command processor 12 receives motion commands from a source of motion command signals 11 and generates a series of electrical subcommand signals. Each subcommand signal represents the desired motion of the device over the cycle corresponding to the subcommand. During each cycle, motion detector 14 generates a signal representative of a single motion characteristic of the device 100. Subcommand comparator 16 receives the series of subcommands generated by command processor 12 and receives the series of motion characteristic signals produced by motion detector 14. During each cycle, subcommand comparator 16 calculates any motion information it needs and compares the commanded and actual motion and generates an error signal relating to the difference between the commanded and actual motion.

Modifier 18 receives motion error signals from subcommand comparator 16 and modifies the series of error signals to enable system 10 to achieve a set of desired system characteristics. Depending on the exact configuration of control system 10, error signal modifier 18 may pass modified error signals back to subcommand comparator 16 to enable subcommand comparator 16 to compare the modified error signals with signals calculated by subcommand comparator 16 relating to motion characteristics not measured directly by detector 14. In that case, further error signals are passed to error signal modifier 18. In any case, error signal modifier 18 transmits a series of modified error signals to field orientation control 30 which in turn generates a series of phase control signals. Convertor 20 converts the phase control signals it receives from field orientation control 30 to signals that are applied to device 100 which causes the controlled device to exhibit the desired motion.

In the preferred embodiment of the present invention. Command processor 12 receives signals from the source of motion commands 11 pertaining to the desired position, velocity, and torque of the movable member of motor 101. The movable member of motor 101 is adapted for rotation and can assume any one of 16,384 positions or increments. The value assigned to each subcommand represents the position which is to be assumed by the movable member of motor 101. Accordingly, a command to move to a given position at a given velocity (and accordingly, within a given time period) is implemented by assigning appropriate values to the position subcommands. Command processor 12 creates a position command during a cycle by adding an incremental position signal of an appropriate value to the position command created during the immediately preceding cycle.

Preferably, the cycle frequency of the microprocessor is 1024 cycles per second. Accordingly, the duration of one cycle is 1/1024 seconds, or approximately 0.98 milliseconds. Because each subcommand spans approximately 0.98 milliseconds, the desired velocity of the movable member can be commanded in increments of only 1024 positions per second. Accordingly, command processor 12 varies the values assigned to each subcommand over a time period to permit more precise specification of the velocity of the movable member. In particular, the values of the subcommands over that period are varied between two numbers, n and n+1, to achieve an average value of X for each subcommand over the period, which is between n and n+1. Therefore, the commanded velocity over the period is 1024(X) increments per second. Since X can be a fraction, rather than simply an integer, more precise control of the velocity of the movable member can be achieved.

Figures 13, 14:
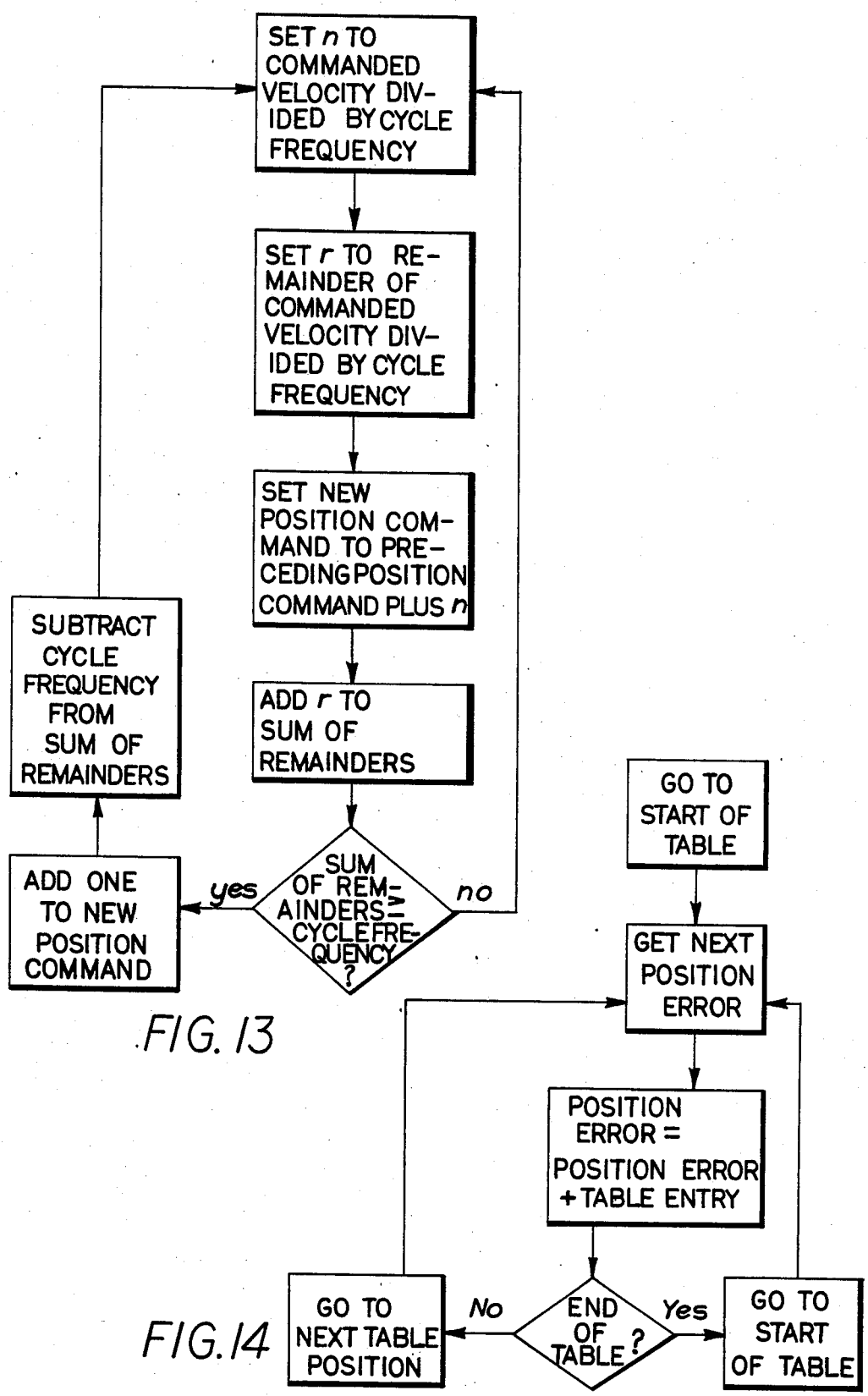
FIG. 13 is a flowchart showing the manner in which the control system shown in FIGS. 9 or 10 generates incremental position signals.
FIG. 14 is a flowchart showing the manner in which the control system shown in FIG. 9 or 10 eliminates deadbands in the system.

FIG. 13 shows in flowchart form the method used to assign values to the incremental position signals to achieve precise position commands and velocity control. Generally, command processor 12 accepts the velocity commands in increments per second and divides it by the microprocessor cycle frequency, which is 1024 cycles per second. That calculation is carried out in integer fashion within the microprocessor; however, the remainder of the division is saved. The integer portion of the division represents the incremental position signal which will be added to the position command calculated during the preceding cycle, while the remainder represents the error that would result from assigning only the integer portion to each subcommand during the interval. Each time the integer is added to the position command to achieve the position command for the next cycle, the remainder value is added to a running sum. When that sum exceeds 1024, the integer value plus one, rather than simply the integer value, is added to the previous subcommand, and 1024 is subtracted from the running sum.

Command processor 12 transmits the series of position subcommands to subcommand comparator 16. Also, during each cycle, subcommand comparator 16 receives a signal representing the actual position of the movable member of motor 101. Subcommand comparator 16 subtracts the signals representing the actual position from the subcommands. Accordingly, subcommand comparator 16 generates a position error signal. Each position error signal represents the variation during each cycle of the actual position from the commanded position. Error signal modifier 18 receives the position error signals and performs the following function on those signals:

$$G(S) + 1/K_A, \tag{1}$$

to achieve a modified position error signal, or velocity command. The fraction term of equation (1) provides the desired acceleration control for system 10. G(S) is a nonlinear function whose purpose is to remove the effect of the lost accuracy resulting from the integer divide represented by the fractional term of equation (1). Without the term G(S), the velocity command would always be a rounded down result, resulting in a critical loss of accuracy in the performance of control system 10.

If n represents the position error signal to be divided by $K_A$, G(S) causes the value of each position error signal operated upon by error signal modifier 18 to alternate between n and n+1, to account for the lost remainder in the integer divide. FIG. 14 illustrates, in flowchart form, the method used to alter the values of some of the position error signals prior to the division by $K_A$. In the preferred embodiment, $K_A$ is equal to 16. Accordingly, the table accessed by the microprocessor following the flowchart of FIG. 14 consists of the following sequential entries: 0, 3, 6, 9, 12, 15, 2, 5, 8, 11, 14, 1, 4, 7, 10 and 13. Generally, the microprocessor, in following the flowchart, performs the following steps:
(1) Go to start of table,
(2) Get next position error,
(3) Set position error to position error plus table entry,
(4) Set velocity command to position error divided by $K_A$,
(5) If at end of table, go to start of table and go to step (2),
(6) Go to next table position,
(7) Go to step (2).

Figure 15:
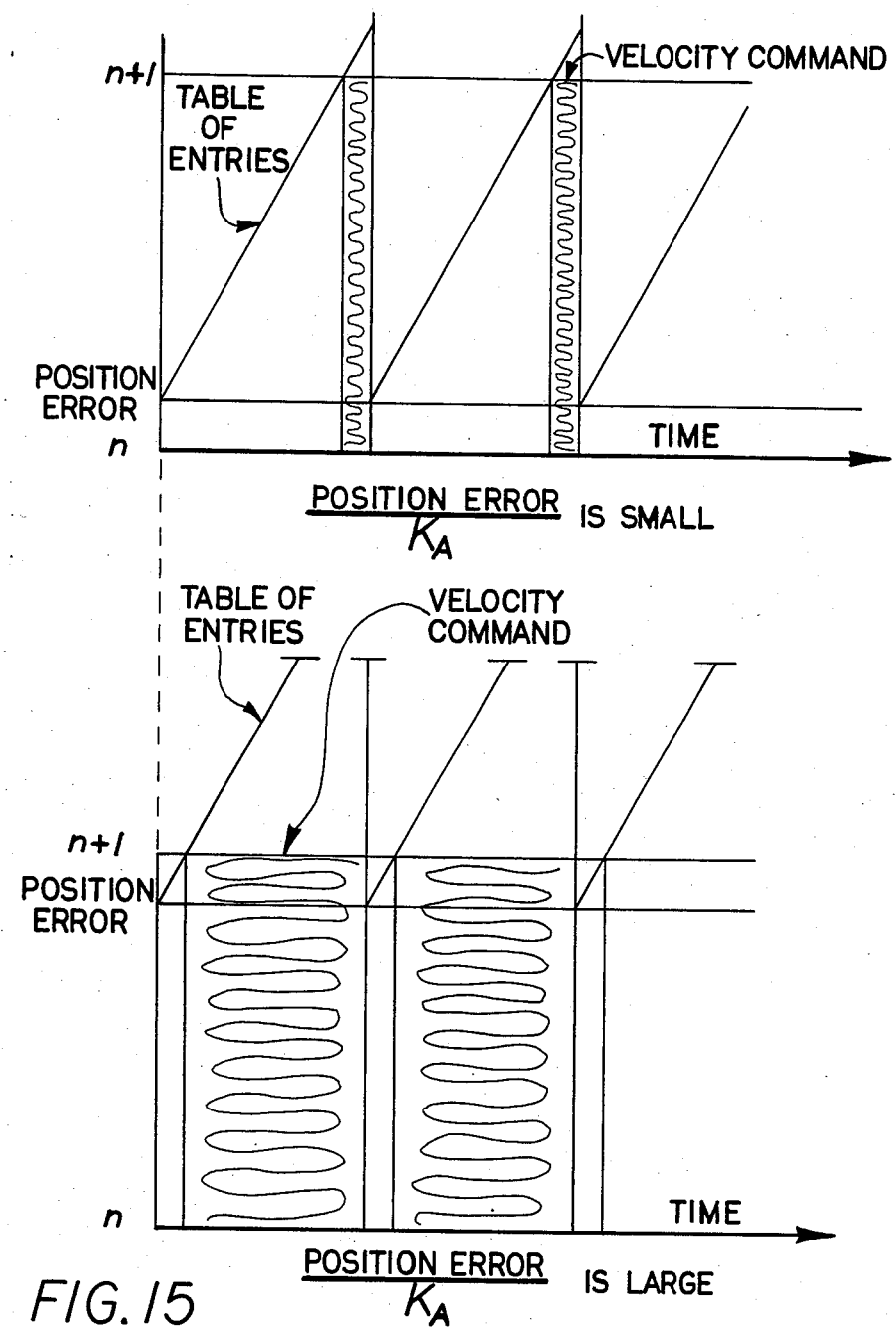
FIG. 15 is a graphical representation of the results of the procedure shown in FIG. 14.
Figure 16:
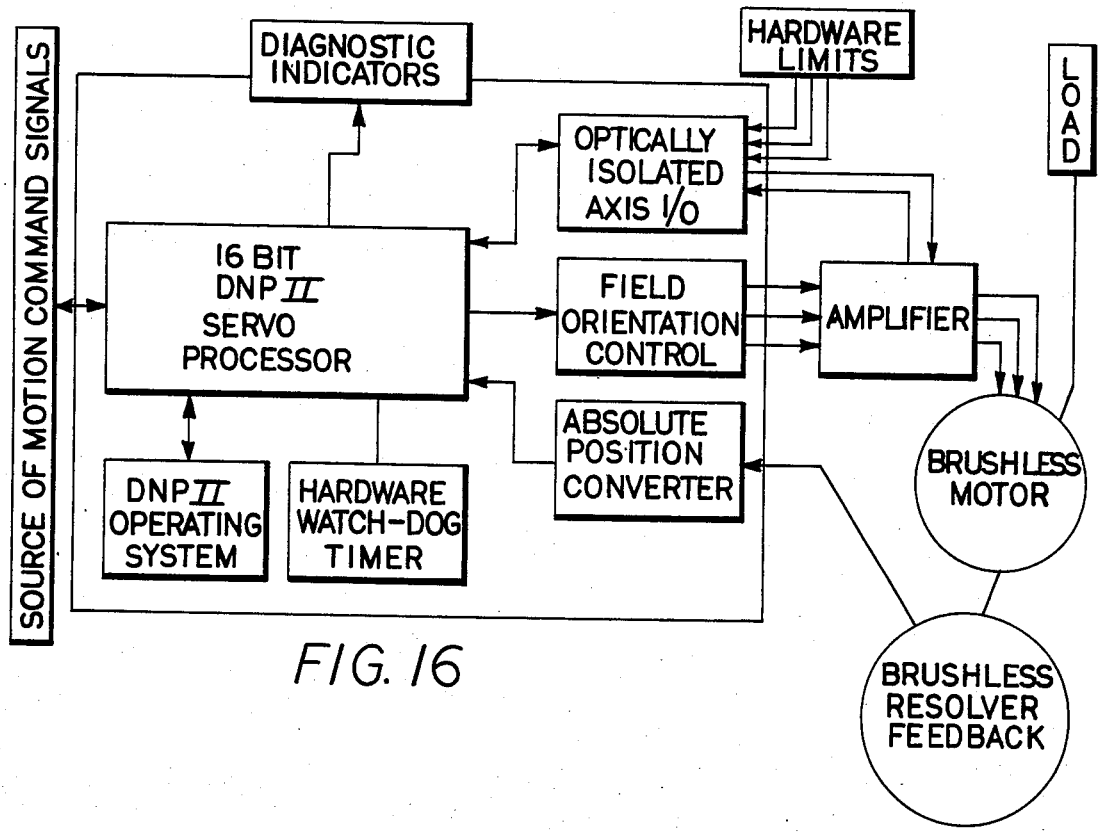
FIG. 16 shows the block diagram of a prototype of the preferred embodiment of the control system described by this invention.

FIG. 15 illustrates graphically the results of the performance of the method depicted in FIG. 14. If $K_A$ is set to a value other than 16, the table entries must be changed. Generally, the first table entry must be zero and the second table entry must be a prime number. Each table entry consists of the immediately preceding table entry plus the prime number. The number of the table entries equals $K_A$.

Error signal modifier 18 transmits the modified position error signal, or velocity command, back to subcommand comparator 16. Subcommand comparator 16 calculates a position difference, or actual velocity signal and compares it with the modified position error signal to generate a velocity error signal representing the difference between the modified position error signal and the position difference signal. Error signal modifier 18 operates on the velocity error signal to provide compensating gain, as in conventional analog control systems. The modified velocity error signal along with torque command 50 are transmitted to field orientation control 30 which in turn generates a phase control signal. The phase control signal is received by a power amplifier and D/A converter 20. Converter 20 converts the phase control signal to a signal which energizes motor 101 and causes its movable member to achieve the desired motion. Converter 20 can include any suitable power amplifier and can be of the pulse width modulator type.

Figure 10:
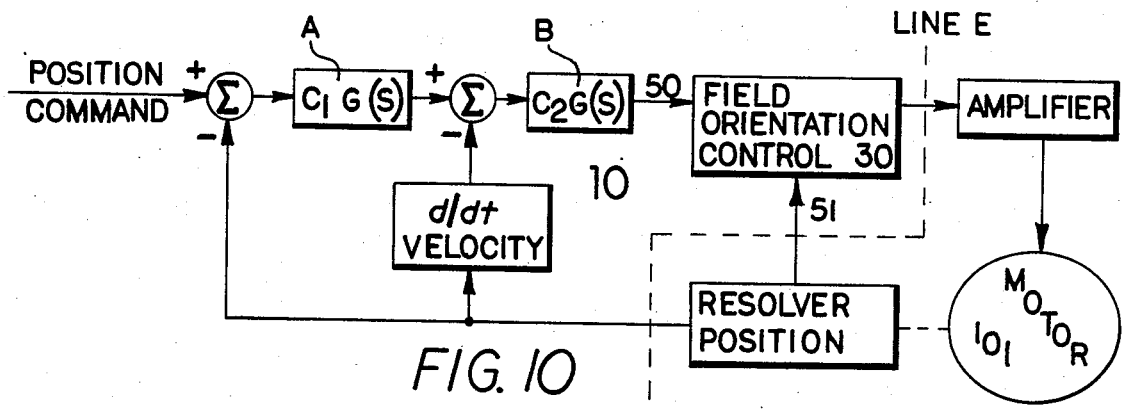
FIG. 10 shows a preferred embodiment of the brushless servo control system described by this invention.
Figure 11:
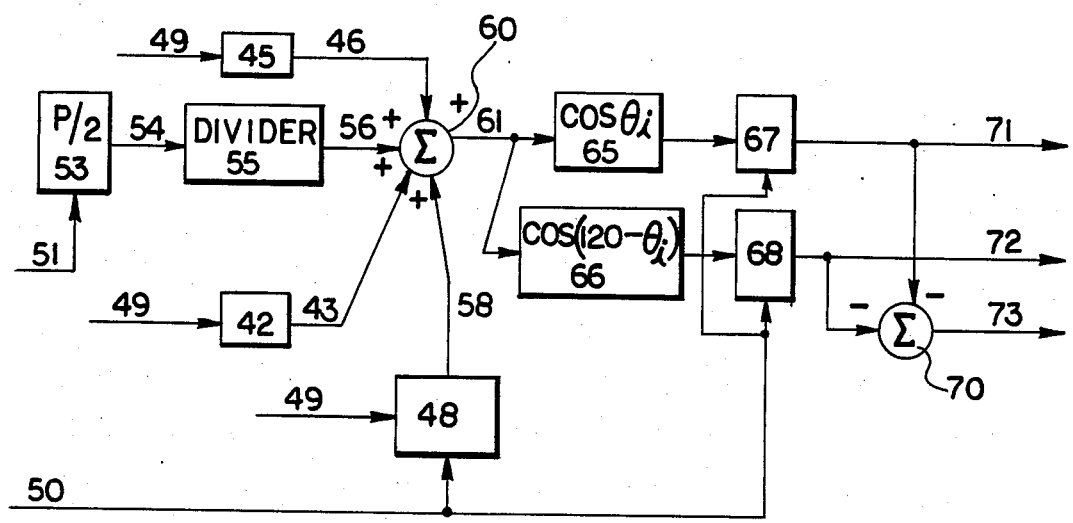
FIG. 11 shows the preferred embodiment of the field orientation control described by this invention.

The present invention enables a digital servo control system 10, similar to the one described above, to control a device 100 including but not limited to a brushless motor 101. This is accomplished by adding field orientation control 30, shown in FIG. 9. FIG. 10 shows the preferred embodiment of the digital servo control system capable of controlling a brushless motor. FIG. 11 shows the preferred embodiment of field orientation control 30. The inputs to field orientation control 30 are the torque command 50 and the rotor position ($\theta p$) 51. With these inputs, field orientation control 30 is capable of producing the necessary stator currents in a 3-phase brushless motor 71, 72 and 73 to produce the desired torque.

Field orientation control 30 converts rotor position 51 from mechanical degrees to electrical degrees using the equation:

$$\theta e = \theta p \times \frac{P}{2}, \quad (2)$$

where $\theta p$ is the rotor position in mechanical degrees, $\theta e$ is the rotor position in electrical degrees and P is the number of magnetic poles on the rotor. The previous discussion of the invention and the prior art has been in terms of electrical degrees which correspond to physical degrees. This only occurs on a 2 pole motor (i.e., when P=2). If one has a motor with P poles, the equivalent electrical angle is given by equation (2). Since the field orientation control of this invention can be used on a motor having P poles, the controller must convert the rotor position, which is in physical degrees, to rotor flux position, which is in electrical degrees, using equation (2).

Equation (2) is implemented in FIG. 11 by directing the rotor position signal 51, which is in mechanical degrees through a multiplier 53, having a value of P/2 where P is the fixed number of poles of the motor, to produce a rotor position signal 54, which is in electrical degrees.

In the actual implementation of the digital control system, only a single transducer is used for all the system feedback, including the feedback required to control the stator field currents. The system feedback is typically in terms of rotor position and ranges from 0 to 16,384 corresponding to 0 to 360 mechanical degrees. This rotor position 51 is converted to electrical degrees by multiplier 53. The rotor position in electrical degrees 54 is converted by divider 55 to internal degree units 56. The generation of signal 56, the rotor position in internal units, from signal 51, the rotor position in mechanical degrees, can occur in any order. Either signal 51 can be converted to electrical degrees and then scaled to internal units or it can be scaled to internal units and then converted to electrical degrees. Typically, divider 55 will have a value N=32. The division by N in divider 55 scales the resolver position in electrical degrees 54 to the proper internal units.

The field orientation control 30 also has a means 48 for generating a torque phase angle, which uses torque command 50 and a rotor velocity in electrical degrees 49 to generate a torque phase angle in internal units 58. Typically means 48 generate a torque phase angle in electrical degrees and converts it to internal units. This torque phase angle is the angle in electrical degrees by which the stator magnetic field should lead or lag the rotor magnetic field. This torque phase angle can be varied depending on the desired level of torque and speed.

The torque phase angle in electrical degrees is converted by means 48 into a torque phase angle in internal units 58 through the use of a table implemented by either hardware or software. This table contains 0 to 128 in internal units which correspond to 0 to 90 in electrical degrees. One looks up the torque phase angle in electrical degrees in the table to find the corresponding torque phase angle in internal units 58. For example, if the desired torque phase angle in electrical degrees is 45°, then from the table the desired torque phase angle in internal units is 64. The table only needs to contain values corresponding to 0 to 90 in electrical degrees because this is the range over which the stator magnetic field usually leads or lags the rotor magnetic field. This results in reasonably sized table which can be stored as software in the microprocessor memory and which is accurate enough for control purposes.

The electrical angle control signal ($\theta i$) 61 for the stator, measured in internal degree units is obtained by adding together in accumulator 60, the resolver position in internal units 56 and a torque phase angle in internal units 58. If the torque command 50 is positive the torque phase angle 58 is added to signal 56 in accumulator 60. If the torque command is negative, the torque phase angle 58 is subtracted from signal 56 in accumulator 60.

The field orientation control 30 must then generate the necessary phase control signals by taking the electrical angle control signal 61 in internal degree units and breaking it into components to determine the currents which should be applied to the stator of a 3-phase brushless motor.

For a 3-phase brushless motor, the following relationships hold:

$$\text{Phase A } \alpha \text{ I COS } \theta i \qquad (3)$$

$$\text{Phase B } \alpha \text{ I COS } (120° - \theta i) \qquad (4)$$

$$\text{Phase C } \alpha \text{ I COS } (240° - \theta i) \qquad (5)$$

where Phase A, Phase B, and Phase C are the 3-phase winding currents, I is the magnitude of the torque command 50 and $\theta i$ is the electrical angle control signal for the stator in internal degree units 61. The resulting vector magnitude of Phase A, Phase B, and Phase C will be proportional to the magnitude of I.

To determine the current components which should be applied to the stator windings, field orientation control 30 uses trigonometric tables 65 and 66, preferably contained in software, to obtain the values of COS $\theta i$ and COS $(120° - \theta i)$. Each of these values is scaled by 127. These two values are then fed into two multiplying digital to analog converters (D/A's) 67 and 68 whose full scale output of 10 volts occurs when the input is 127. The reference voltage of the multiplying D/A's 67 and 68 is set to the magnitude of the torque command I by the digital control system. The current to Phase A, 71 and to Phase B, 72 is then given by the equations:

$$\text{Phase A} = I \times \frac{10}{127} \times 127 \text{ COS } \theta i = 10 \, I \text{ COS } \theta i \qquad (6)$$

$$\text{Phase B} = I \times \frac{10}{127} \times 127 \text{ COS } (120° - \theta i) = \qquad (7)$$

$$10 \, I \text{ COS } (120° - \theta i)$$

Since Phase C, 73 is equal to the negative of the algebraic sum of 71 and 72 as given by the equation:

$$\text{Phase C} = -\text{Phase A} - \text{Phase B}, \qquad (8)$$

field orientation control 30 must only output Phase A and Phase B. The determination of Phase C can be implemented in hardware from Phase A and Phase B using accumulator 70. These currents are then applied to the stator windings to produce the desired response.

The control system with field orientation has an offset compensator to automatically determine the phase offset between the rotor magnetic field and the magnetic field of the rotor measuring device. The control system does not require that the magnetic field of the rotor measuring device be actually aligned with the rotor field if the relationship between them is known. If the relationship is known, the control system can compensate for the difference in alignment by simply adding the correct electrical offset to the measurement of the rotor measuring device. If the relationship is not known, the control system has the capability of automatically determining the appropriate value of offset compensation. This can be done as part of the automatic setup procedure which is used when a different motor is connected to the control system.

The method for automatically determining the appropriate offset value involves placing a stator field vector on the stator such that it is specifically aligned with one of the phases such as Phase A. This will cause the rotor to align the rotor field with the stator field. If the stator vector on Phase A is arbitrarily defined to be zero, any difference measured by the rotor measuring device will be the offset between the rotor field and the field of the rotor measuring device. The control system with field orientation compensates for this offset by subtracting it from the measured rotor position.

As part of the process of automatically determining the phase offset between the rotor magnetic field and the magnetic field of the rotor measuring device, the control system can compensate for any phase-reversal caused by the way the rotor measuring device is electrically connected to the system. A stator field vector is applied to cause the rotor to rotate in a direction arbitrarily defined to be positive. If the rotor measuring device detects the rotor motion as being in the positive direction, then the arbitrarily defined positive direction is correct. If the rotor measuring device detects the rotor motion as being in the negative direction then the control system automatically defines the opposite direction as being positive.

The capabilities of the system remove the need to pre-align the mechanical aspects of the rotor measuring device and also provides an automatic and more accurate method of setting up the proper orientation in a brushless motor.

Figure 12:
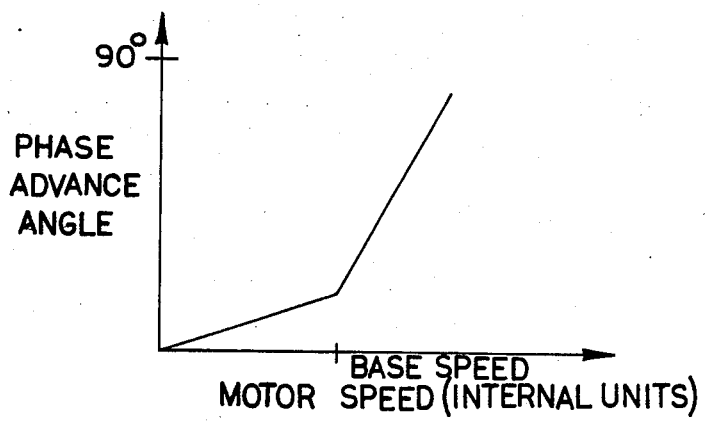
FIG. 12 shows a typical graph of the phase advance angle values contained in the phase advance table vs. motor velocity.

The digital control system with field orientation uses an improved means 42 for implementing phase advance which makes the motor more versatile by allowing greater motor speeds. The control system, instead of implementing the dynamic phase advance in hardware uses a table of values stored in software. This allows the easy conversion from one brushless motor to another and provides greater flexibility under varying load conditions since the table is not permanently fixed in hardware. The values in the table are determined experimentally and can be varied. The values which are used depend on the specific requirements and constraints of the device and control system. A typical graph of the phase advance angle values contained in the phase advance table vs. motor velocity is shown in FIG. 12.

Implementation of the phase advance technique uses a table of phase advance angles which is indexed by rotor velocity in electrical degrees 49. The table contains 128 entries which is more than sufficient to cover the required range of motor speeds given that the maximum phase advance is 90°. The actual rotor velocity is calculated or measured and used as the index of the table to obtain the optional phase advance angle in internal degrees 43. This optional phase advance angle is combined in accumulator 60 to obtain an electrical angle control signal with dynamic phase advance.

Finally, the digital control system with field orientation described by this invention uses a time lag compensator 45 to compensate for time lags in the system.

There are two major components to system time lags. One is due to the fact that it takes a finite time to do the required calculations to determine the correct positioning or phasing of the stator field. This means that the rotor field has advanced from the measured position when the next set of stator currents is applied. This calculation time lag can be exactly computed and for this digital control system is approximately 0.49 msec. (i.e., ½ of the field orientation cycle).

The second time lag is due to the movement of the rotor field during the field orientation cycle in which a given stator field is applied. As a result of this time lag, the applied stator field orientation is only correct at the instantaneous start of the cycle and not correct for the remainder of the cycle. Accordingly, it is preferable to select the stator field based on the position of the rotor field at the midpoint of the cycle rather than its measured position at the start of the cycle. This selection allows the system to provide a more constant torque over the cycle.

To implement this second time lag compensation, the digital control system calculates during each field orientation cycle the difference between the new position of the rotor field and the last position of the rotor field. For the present embodiment the field orientation cycle occurs approximately every 0.98 msec so that the midpoint of the interval occurs at 0.49 msec. Thus ½ of the difference between the new position of the rotor field and the last position of the rotor field will advance the stator field to the midpoint of the field orientation cycle.

The calculation time lag, however, is also 0.49 msec so that the total time lag for the system is 0.98 msec or one field orientation cycle. Thus the total time lag compensation is just the difference between the last rotor field position and the current measured rotor field position which is the same as the rotor velocity.

Accordingly, time lag compensator 45 takes the rotor velocity in electrical degrees 49 and generates a time lag compensation signal in internal units 46 which is combined in accumulator 60 to obtain an electrical angle control signal with time lag compensation. Time lag compensator 45 converts the rotor velocity in electrical degrees to internal units by means of a table similar to that used by the means for generating a torque phase angle.

In the preferred embodiment, everything to the left of Line E in FIG. 9 or 10 is implemented in a digital fashion using a microprocessor. An example of the preferred embodiment using a 16-bit, 5 MHZ, 8088 microprocessor is shown in FIG. 17. The preferred embodiment also uses a Z80A main processor with 64K byte RAM to generate the desired motion commands and to control the entire system. Currently the entire system can control the moveable member or rotor of eight different brushless motors, each motor with its own 8088 microprocessor controller.

While a presently preferred embodiment of the invention has been shown and described, it may be otherwise embodied within the scope of the appended claims.

What is claimed is:

1. A sampled data system for controlling a device's motion comprising:
   (a) a source of motion command signals;
   (b) a command processor for processing a command representative of a desired motion of the device by generating at least one series of electrical subcommand signals, each subcommand signal representing a segment of the desired motion over a time period, said command processor being electrically connected to said source of motion command signals;
   (c) a subcommand comparator electrically connected to said command processor and adapted for connection to a motion detector to compare said subcommand signals to at least one signal from said motion detector representative of the actual motion of the device and generating at least one error signal representative of a variation in a characteristic of the actual motion of the device from a corresponding characteristic of the motion represented by the subcommand signals;
   (d) a motion detector for detecting a motion characteristic of the actual motion of the device and generating a signal representative of said motion characteristic electrically connected to said subcommand comparator;
   (e) an error signal modifier electrically connected to said subcommand comparator so that signals can be directed in either direction to or from said modifier, said error signal modifier being adapted to output a signal to a field orientation control;
   (f) a field orientation control for generating from said modified error signal at least one phase control signal to control the field orientation of the device electrically connected to said error signal modifier; and
   (g) a converter for converting at least one of said phase control signals to a signal applied to the device causing the device to exhibit the desired motion, said converter electrically connected to said field orientation control and to said device.

2. A sampled data system for controlling the motion of a device as described in claim 1 and further comprising:
   an offset compensator for determining and compensating for any electrical offset between the device and said motion detector electrically connected between said subcommand comparator and said motion detector.

3. A sampled data system for controlling the motion of a device as described in claim 2 and further comprising:
   a means for implementing phase advance electrically connected to said field orientation control.

4. A sampled data system for controlling the motion of a device as described in claim 2 and further comprising:
   a time lag compensator for compensating for time lags in the system electrically connected to said field orientation control.

5. A sampled data system for controlling the motion of a device as described in claim 4 and further comprising:
   a means for implementing phase advance electrically connected to said field orientation control.

6. A sampled data system for controlling the motion of a device as described in claim 1 and further comprising:
   a means for implementing phase advance electrically connected to said field orientation control.

7. A sampled data system for controlling the motion of a device as described in claim 1 and further comprising:
   a time lag compensator for compensating for time lags in the system electrically connected to said field orientation control.

8. A sampled data system for controlling the motion of a device as described in claim 1 wherein said field orientation control comprises a:
   (a) means for converting a signal in mechanical degrees to a signal in electrical degrees;
   (b) means for generating an electrical angle control signal electrically connected to said means for converting a signal in mechanical degrees; and
   (c) means for producing at least one phase control signal by resolving said electrical angle control signal into one or more components electrically connected to said means for generating the electrical angle control signal.

9. A sampled data system for controlling the motion of a device as described in claim 8 and further comprising:
   an offset compensator for determining and compensating for any electrical offset between the device and said motion detector electrically connected between said subcommand comparator and said motion detector.

10. A sampled data system for controlling the motion of a device as described in claim 9 and further comprising:
   (a) a means for implementing phase advance electrically connected to said means for generating an electrical angle control signal; and
   (b) a time lag compensator for compensating for time lags in the system electrically connected to said means for generating an electrical control signal.

11. A sampled data system for controlling the motion of a device as described in claim 8 and further comprising:
   a means for implementing phase advance electrically connected to said means for generating an electrical angle control signal.

12. A sampled data system for controlling the motion of a device as described in claim 8 and further comprising:
   a time lag compensator for compensating for time lags in the system electrically connected to said means for generating an electrical angle control signal.

13. A sampled data system for controlling the motion of a device as described in claim 1 wherein said field orientation control comprises a:
   (a) means for converting a device motion signal in mechanical degrees to a device motion signal in electrical degrees;
   (b) means for converting a device motion signal in external units to a device motion signal in internal units electrically connected to said means for converting a device motion signal in mechanical degrees;
   (c) means for generating a torque phase angle;
   (d) an accumulator for combining said torque phase angle and a device motion signal to generate an electrical angle control signal electrically connected to said means for generating a torque phase angle and to said means for converting a device motion signal in external units; and
   (e) means for producing at least one phase control signal by resolving said electrical angle control signal into components, consisting of a trigonometric conversion table electrically connected to said accumulator and to at least one digital to analog converter with amplification.

14. A sampled data system for controlling the motion of a device as described in claim 13 wherein said device is a brushless motor.

15. A sampled data system for controlling the motion of a device as described in claim 14 wherein said motor is a 3-phase motor.

16. A sampled data system for controlling the motion of a device as described in claim 13 and further comprising:
   an offset compensator for determining and compensating for any electrical offset between the device and said motion detector electrically connected between said subcommand comparator and said motion detector wherein said offset compensator measures the electrical offset and combines the offset with the detected motion characteristic to obtain a more accurate motion characteristic signal.

17. A sampled data system for controlling the motion of a device as described in claim 16 and further comprising:
   (a) a means for implementing phase advance electrically connected to said accumulator wherein a table of phase advance angles is used to obtain an optimal phase advance angle to be combined in the accumulator with a torque phase angle, a device motion signal and a time lag compensation signal to generate the desired electrical angle control signal; and
   (b) a time lag compensator for compensating for time lags in the system electrically connected to said accumulator wherein any variation between the present device position and the position of the device at the last sampling cycle is used to generate a time lag compensation signal which is combined in the accumulator with a torque phase angle, a device motion signal and an optimal phase advance angle to generate the desired electrical angle control signal.

18. A sampled data system for controlling the motion of a device as described in claim 17 wherein said device is a brushless motor.

19. A sampled data system for controlling the motion of a device as described in claim 18 wherein said motor is a 3-phase motor.

20. A sampled data system for controlling the motion of a device as described in claim 13 and further comprising:
   a means for implementing phase advance electrically connected to said accumulator wherein a table of phase advance angles is used to obtain an optimal phase advance angle to be combined in the accumulator with a torque phase angle and a device motion signal to generate in the accumulator the desired electrical angle control signal.

21. A sampled data system for controlling the motion of a device as described in claim 13 and further comprising:
   a time lag compensator for compensating for time lags in the system electrically connected to said accumulator wherein any variation between the present device position and the position of the device at the last sampling cycle is used to generate a time lag compensation signal which is combined in the accumulator with a torque phase angle and a device motion signal to generate the desired electrical angle control signal.

22. In a sampled data system for controlling the motion of a device having a source of motion command signals, a command processor for processing a command and generating a series of electrical subcommand signals, a motion detector for detecting a motion characteristic of the actual motion of the device, a subcommand comparator for comparing the detected motion characteristic to the electrical subcommand signal and generating at least one error signal, a modifier for modifying the error signal and a converter for converting the error signal to a signal applied to the device wherein the improvement comprises: a field orientation control for controlling the field orientation of the device by using the modified error signal to generate at least one phase control signal which is converted by the converter to a signal applied to the device; wherein said field orientation control comprises a:
 (a) means for converting a signal in mechanical degrees to a signal in electrical degrees;
 (b) means for generating an electrical angle control signal electrically connected to said means for converting a signal in mechanical degrees; and
 (c) means for producing at least one phase control signal by resolving said electrical angle control signal into one or more components electrically connected to said means for generating the electrical angle control signal.

23. In a sampled data system for controlling the motion of a device as described in claim 22 wherein the improvement further comprises:
an offset compensator for determining and compensating for any electrical offset between the device and said motion detector electrically connected between said subcommand comparator and said motion detector.

24. In a sampled data system for controlling the motion of a device as described in claim 23 wherein the improvement further comprises:
 (a) a means for implementing phase advance electrically connected to said field orientation control; and
 (b) a time lag compensator for compensating for time lags in the system electrically connected to said field orientation control.

25. In a sampled data system for controlling the motion of a device as described in claim 22 wherein the improvement further comprises:
a means for implementing phase advance electrically connected to said field orientation control.

26. In a sampled data system for controlling the motion of a device as described in claim 22 wherein the improvement further comprises:
a time lag compensator for compensating for the lags in the system electrically connected to said field orientation control.

27. In a sampled data system for controlling the motion of a device having a source of motion command signals, a command processor for processing a command and generating a series of electrical subcommand signals, a motion detector for detecting a motion characteristic of the actual motion of the device, a subcommand comparator for comparing the detected motion characteristic to the electrical subcommand signal and generating at least one error signal, a modifier for modifying the error signal and a converter for converting the error signal to a signal applied to the device wherein the improvement comprises: a field orientation control for controlling the field orientation of the device by using the modified error signal to generate at least one phase control signal which is converted by the converter to a signal applied to the device; wherein said field orientation control comprises a:
 (a) means for converting a device motion signal in mechanical degrees to a device motion signal in electrical degrees;
 (b) means for converting a device motion signal in external units to a device motion signal in internal units electrically connected to said means for converting a device motion signal in mechanical degrees;
 (c) means for generating a torque phase angle;
 (d) an accumulator for combining said torque phase angle and a device motion signal to generate an electrical angle control signal electrically connected to said means for generating a torque phase angle and to said means for converting a device motion signal in external units; and
 (e) means for producing at least one phase control signal by resolving said electrical angle control signal into components, consisting of a trigonometric conversion table electrically connected to said accumulator and to at least one digital to analog converter with amplification.

28. In a sampled data system for controlling the motion of a device as described in claim 27 wherein the improvement further comprises:
an offset compensator for determining and compensating for any electrical offset between the device and said motion detector electrically connected between said subcommand comparator and
said motion detector wherein said offset compensator measures the electrical offset and combines the offset with the detected motion characteristic to obtain a more accurate motion characteristic signal.

29. In a sampled data system for controlling the motion of a device as described in claim 28 wherein the improvement further comprises:
 (a) a means for implementing phase advance electrically connected to said accumulator wherein a table of phase advance angles is used to obtain an optimal phase advance angle to be combined in the accumulator with a torque phase angle, a device motion signal and a time lag compensation signal to generate the desired electrical angle control signal; and
 (b) a time lag compensator for compensating for time lags in the system electrically connected to said accumulator wherein any variation between the present device position and the position of the device at the last sampling cycle is used to generate a time lag compensation signal which is combined in the accumulator with a torque phase angle, a device motion signal and an optional phase advance angle to generate the desired electrical angle control signal.

30. In a sampled data system for controlling the motion of a device as described in claim 27 wherein the improvement further comprises:
a means for implementing phase advance electrically connected to said accumulator wherein a table of phase advance angles is used to obtain an optimal phase advance angle to be combined in the accumulator with a torque phase angle and a device motion signal to generate the desired electrical angle control signal.

31. In a sampled data system for controlling the motion of a device as described in claim 27 wherein the improvement further comprises:
a time lag compensator for compensating for time lags in the system electrically connected to of said accumulator wherein any variation between the present device position and the position of the device at the last sampling cycle is used to generate a time lag compensation signal which is combined in the accumulator with a torque phase angle and a device motion signal to generate the desired electrical angle control signal.

* * * * *

UNITED STATES PATENT AND TRADEMARK OFFICE
CERTIFICATE OF CORRECTION

PATENT NO. : 4,701,839
DATED : October 20, 1987
INVENTOR(S) : McNally et al.

It is certified that error appears in the above—identified patent and that said Letters Patent is hereby corrected as shown below:

Column 1, lines 34 and 35: please delete ap-proprriate-- and substitute "appropriate" therefor.
Column 5, line 63: please delete --straight forward-- and substitute "straightforward" therefor.
Column 7, line 52: please delete --.-- and substitute "," therefor.
Column 7, line 53: please delete --Command-- and substitute "command" therefor.
Column 17, line 53: please delete --the-- and substitute "time" therefor.
Column 19, line 5: please delete --of--.

Signed and Sealed this

Twenty-seventh Day of September, 1988

Attest:

DONALD J. QUIGG

Attesting Officer   Commissioner of Patents and Trademarks